(12) United States Patent
Sakamoto et al.

(10) Patent No.: US 10,379,723 B2
(45) Date of Patent: Aug. 13, 2019

(54) MACHINING PROGRAM EDITING APPARATUS AND MACHINE TOOL HAVING THE SAME

(71) Applicant: DMG MORI CO., LTD., Yamatokoriyama-shi, Nara (JP)

(72) Inventors: Hironari Sakamoto, Yamatokoriyama (JP); Takashi Yamamoto, Sapporo (JP)

(73) Assignee: DMG MORI CO., LTD., Yamatokoriyama-shi, Nara (JP)

( * ) Notice: Subject to any disclaimer, the term of this patent is extended or adjusted under 35 U.S.C. 154(b) by 17 days.

(21) Appl. No.: 15/374,580

(22) Filed: Dec. 9, 2016

(65) Prior Publication Data

US 2017/0168698 A1  Jun. 15, 2017

(30) Foreign Application Priority Data

Dec. 14, 2015 (JP) .................................. 2015-243625

(51) Int. Cl.
| | |
|---|---|
| G06F 3/0484 | (2013.01) |
| G05B 19/414 | (2006.01) |
| G06F 3/0481 | (2013.01) |
| G06F 3/0483 | (2013.01) |
| G05B 19/409 | (2006.01) |
| G05B 19/4093 | (2006.01) |
| G06F 9/451 | (2018.01) |

(52) U.S. Cl.
CPC ....... *G06F 3/04847* (2013.01); *G05B 19/409* (2013.01); *G05B 19/40937* (2013.01); *G05B 19/4147* (2013.01); *G06F 3/0481* (2013.01); *G06F 3/0483* (2013.01); *G05B 2219/36031* (2013.01); *G05B 2219/49372* (2013.01); *G06F 9/451* (2018.02); *Y02P 90/265* (2015.11)

(58) Field of Classification Search
None
See application file for complete search history.

(56) References Cited

U.S. PATENT DOCUMENTS 5,155,425 A * 10/1992 Seki ...................... G05B 19/406
                                                    318/567
7,603,382 B2 * 10/2009 Halt, Jr. ............ G06F 17/30899
(Continued)

FOREIGN PATENT DOCUMENTS

JP  2002-126975 A   5/2002

OTHER PUBLICATIONS

'About WinMax Mill Help' pp. 18, 50-55, and 202, Hurco Companies, Inc. (2007).*

*Primary Examiner* — Bernard G Lindsay
(74) *Attorney, Agent, or Firm* — Muncy, Geissler, Olds & Lowe, P.C.

(57) ABSTRACT

A machining program editing apparatus that enables a machining program to be edited accurately in a short time, and a machine tool having the same, are provided. A machining program editing apparatus 1 for editing a machining program of a machine tool 10 includes a control means 5 for controlling the display content of a display means 3 for displaying the machining program. When a preset NC code, among the NC codes included in the machining program, is selected on the display means 3, the control means 5 allows an edit window 7 for inputting an editing content, according to the type of the NC code, to be displayed near the display position of the NC code.

8 Claims, 13 Drawing Sheets

(56) References Cited

U.S. PATENT DOCUMENTS

| | | | | |
|---|---|---|---|---|
| 2013/0257738 A1* | 10/2013 | Tanaka | ................ | G05B 19/409 |
| | | | | 345/168 |
| 2015/0253759 A1* | 9/2015 | Nagato | .............. | B23Q 17/0952 |
| | | | | 700/175 |
| 2017/0031345 A1* | 2/2017 | Ono | ..................... | G05B 19/409 |
| 2017/0300035 A1* | 10/2017 | Kawai | ................ | G05B 19/4068 |

* cited by examiner

| PRESET NC CODE | EDIT WINDOW TO BE DISPLAYED |
|---|---|
| G54 to G59 (WORKPIECE COORDINATE SYSTEM) | WORKPIECE OFFSET SETTING WINDOW |
| T CODE | TOOL SELECTION WINDOW |
| D CODE, H CODE | TOOL OFFSET SELECTION WINDOW |
| G CODE WITH PARAMETERS OTHER THAN G54 to G59 | GUIDANCE INPUT WINDOW |
| S CODE, F CODE | ·NUMERICAL VALUE INPUT PAD TAB<br>·MACHINING CONDITION CALCULATION TAB |
| COORDINATE VALUE CODE (X, Y, Z, U, V, W, A, B, C) | NUMERICAL VALUE INPUT PAD |

71(7)

SELECTION OF WORKPIECE OFFSET

| AXIS | G54 | G55 | G56 |
|---|---|---|---|
| X | 2.08142 | 0.02823 | 0.00000 |
| Y | 0.44154 | 0.42697 | 0.00000 |
| Z | 0.00000 | 0.00000 | 0.00079 |
| B | 0.0000 | 0.0000 | 0.0009 |
| C | 0.0000 | 0.0000 | 0.0000 |
| R | 39999.999 | 0.000 | 0.002 |

| GGGHP | | YPPUT | | 00:03:2D:28:6B:B0 | |
|---|---|---|---|---|---|

| AXIS | G57 | G58 | G59 |
|---|---|---|---|
| X | 0.00000 | 0.00000 | 0.00000 |
| Y | 0.00000 | 0.00000 | 0.00000 |
| Z | 7.87402 | 0.00000 | 0.0000 |
| B | 0.0000 | 0.0000 | 0.0000 |
| C | 69.5840 | 0.0000 | 0.0000 |
| R | 0.000 | 0.000 | 10.005 |

| \multicolumn{9}{c|}{SELECTION OF TOOL} |
|---|

SEARCH CONDITION

| TOOL NAME | MACHINING |
|---|---|
| GENERAL PURPOSE OUTER DIAMETER | ROUGH |

SHAPE POCKET ANGLE  0.000

| MANAGEMENT NO. | TOOL DIRECTION | UNDERCUT | USAGE | T CODE | NOSE R | POCKET ANGLE | INCLUDED ANGLE | COMMENTS |
|---|---|---|---|---|---|---|---|---|
| 1000 |  | INVALID | ROUGH | 202 | 0.800 | 5.000 | 80.000 | |
| 1002 |  | VALID | ROUGH | 202 | 0.800 | 32.000 | 55.000 | |

TOOL MANAGEMENT    CANCEL

| OFFSET NO. | | X | Z | Y | B | C | TOOL NAME |
|---|---|---|---|---|---|---|---|
| \multicolumn{2}{c}{SELECTION OF TOOL OFFSET} | | | | | | |

| OFFSET NO. | | X | Z | Y | B | C | TOOL NAME |
|---|---|---|---|---|---|---|---|
| 1 | SHAPE | 0.000 | 0.000 | 0.000 | 0.000 | 0 | |
| | ABRASION | 0.000 | 0.000 | 0.000 | 0.000 | 0 | |
| 2 | SHAPE | 0.000 | 0.000 | 0.000 | 0.000 | 0 | |
| | ABRASION | 0.000 | 0.000 | 0.000 | 0.000 | 0 | |
| 3 | SHAPE | 0.000 | 0.000 | 0.000 | 0.000 | 0 | |
| | ABRASION | 0.000 | 0.000 | 0.000 | 0.000 | 0 | |
| 4 | SHAPE | 0.000 | 0.000 | 0.000 | 0.000 | 0 | |
| | ABRASION | 0.000 | 0.000 | 0.000 | 0.000 | 0 | |
| 5 | SHAPE | 0.000 | 0.000 | 0.000 | 0.000 | 0 | |
| | ABRASION | 0.000 | 0.000 | 0.000 | 0.000 | 0 | |
| 6 | SHAPE | 0.000 | 0.000 | 0.000 | 0.000 | 0 | |
| | ABRASION | 0.000 | 0.000 | 0.000 | 0.000 | 0 | |
| 7 | SHAPE | 0.000 | 0.000 | 0.000 | 0.000 | 0 | |
| | ABRASION | 0.000 | 0.000 | 0.000 | 0.000 | 0 | |

SELECTION OF TOOL OFFSET / LIST OF SHAPE AND ABRASION CORRECTION

[FIG. 7]
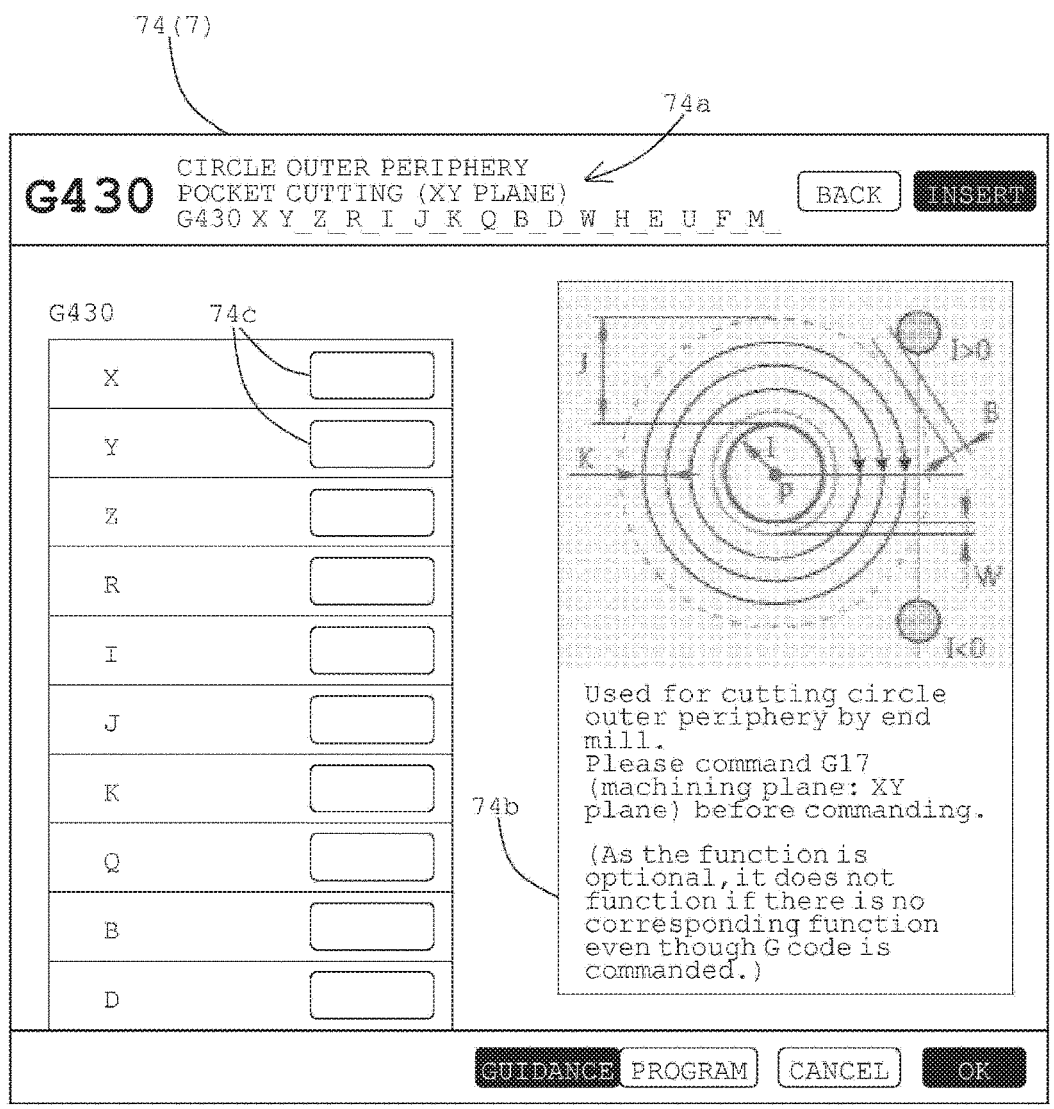

[FIG. 8A]
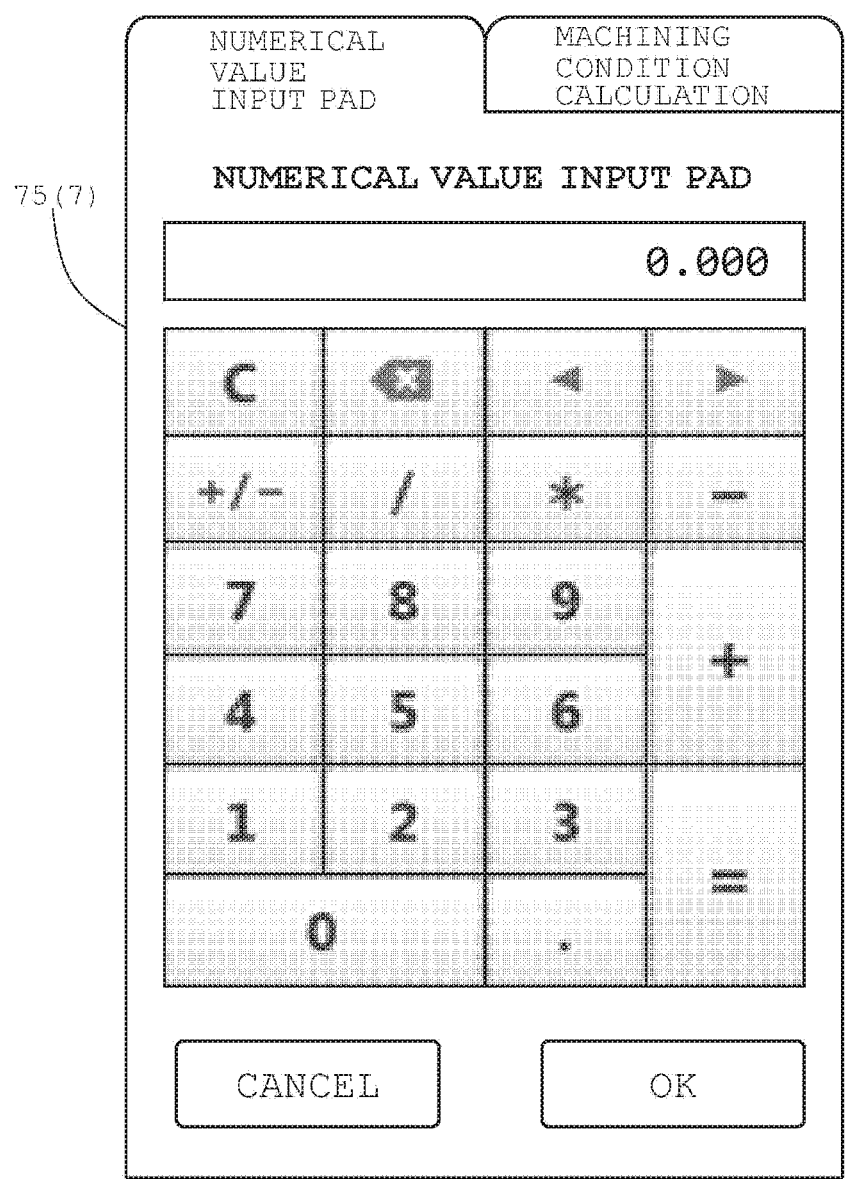

[FIG. 8B]
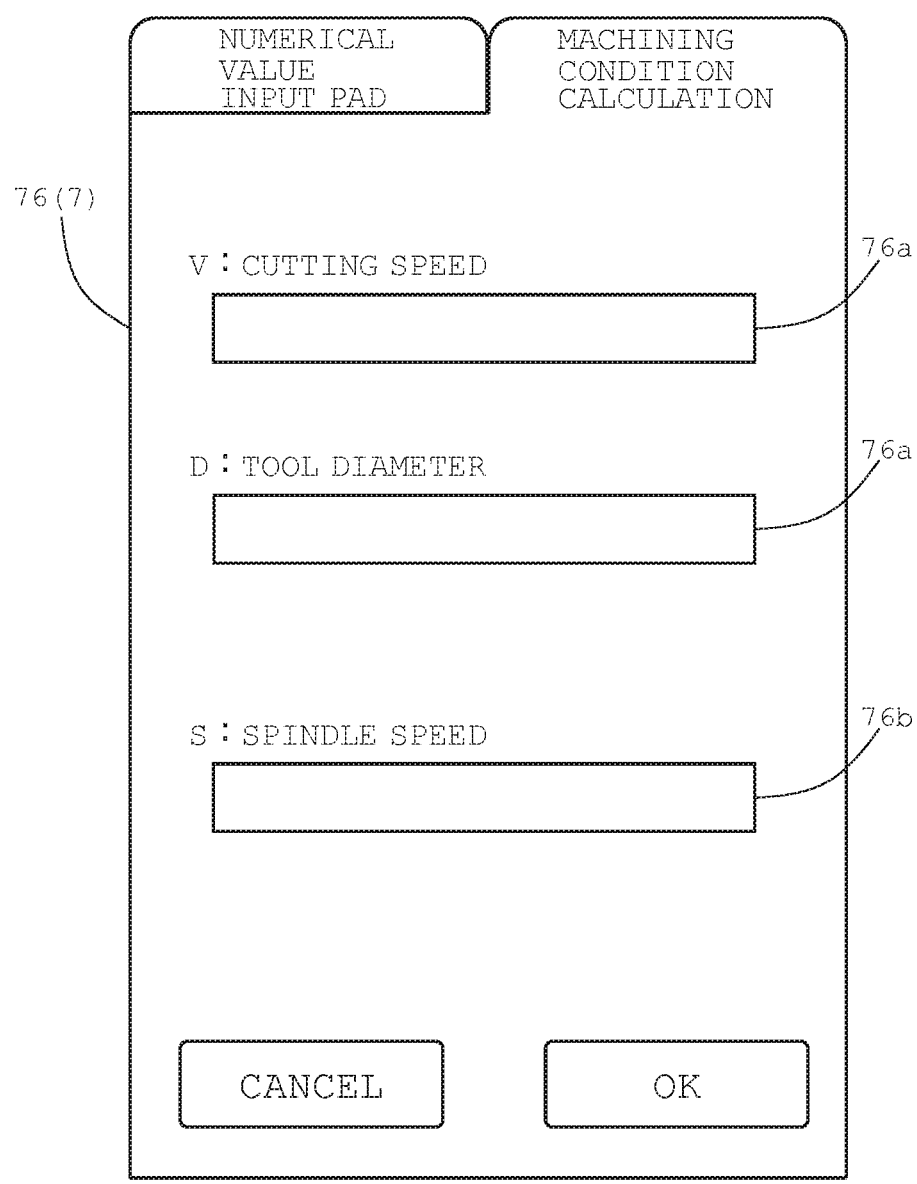

[FIG. 9]
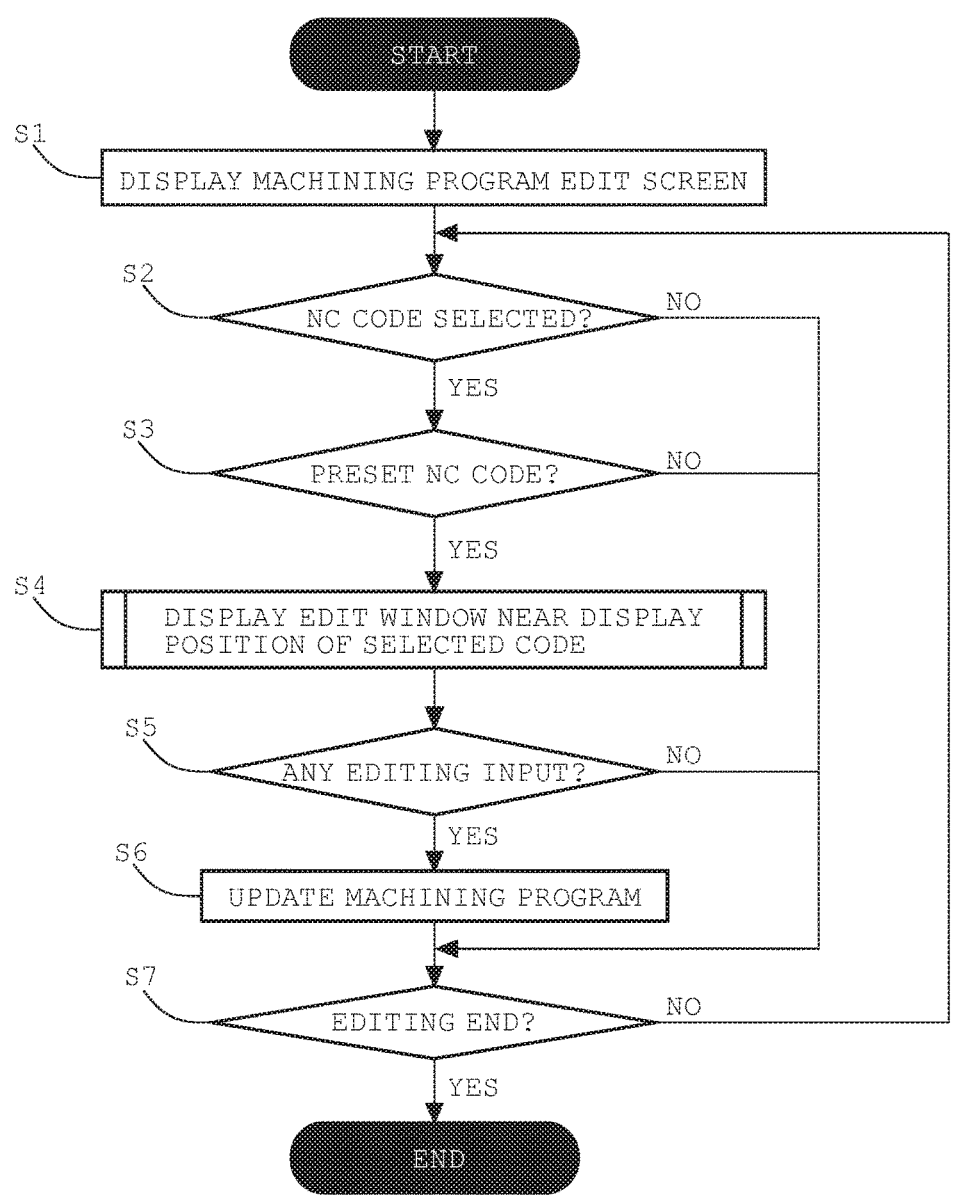

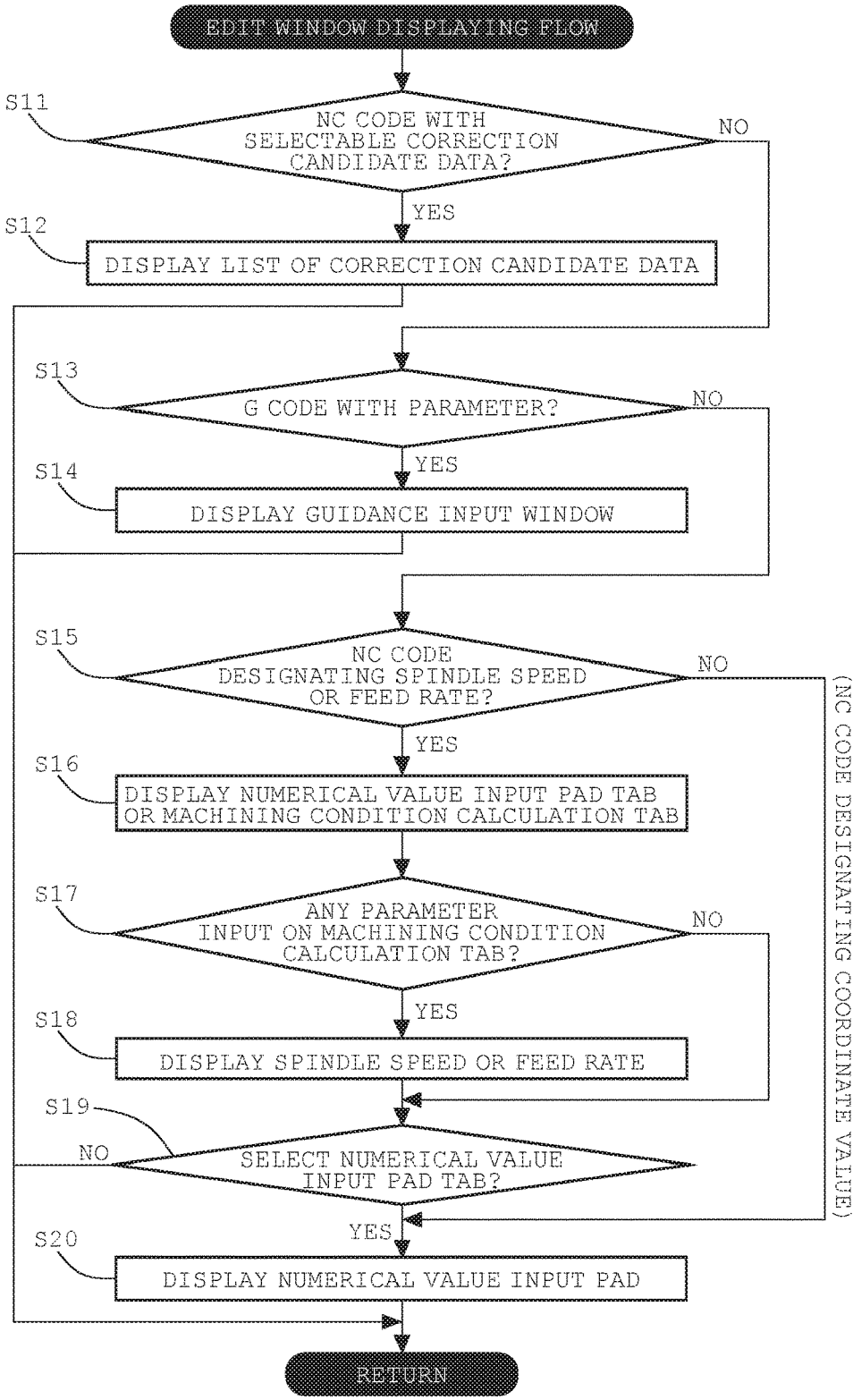

MACHINING PROGRAM EDITING APPARATUS AND MACHINE TOOL HAVING THE SAME

CROSS REFERENCE TO RELATED APPLICATIONS

This application claims priority under 35 USC 119 to Japanese Patent Application No. 2015-243625 filed on Dec. 14, 2015, the entire contents which are incorporated herein by reference.

BACKGROUND OF THE INVENTION

Field of the Invention

The present invention relates to a machining program editing apparatus for editing a machining program to be used for a machine tool or the like, and a machine tool having the same.

Description of the Related Art

Conventionally, when a machining program is newly created, machining simulation or test machining using it is performed. Thereby, it is checked whether or not operation of a machine tool, cutting conditions, and the like designated by the machining program are appropriate, and an editing work is performed as required to correct the machining program. Further, there is also a case of editing an existing machining program properly to create a desired machining program.

As a machining program editing apparatus as described above, Japanese Patent Laid-Open No. 2002-126975 proposes an NC apparatus in which a machining program being edited is displayed on a program edit screen, and by positioning a cursor at an editing point, the content of a command code is input using a character key.

However, in conventional apparatuses for editing a machining program including the invention of Japanese Patent Laid-Open No. 2002-126975, as a hand position on a keyboard is checked each time an editing content is input, it is necessary for a user to move the eyes from the display screen of the machining program. As such, there is a problem that a time lag is caused until the eyes are back to the original position on the display screen so that it takes time for an editing work. Meanwhile, when a user attempts to perform editing without moving the eyes from the display screen, there is another problem that input errors are likely to be caused.

Further, a machining program is described using a special program language named NC code for performing numerical control on a machine tool, and various types of codes are prepared for the NC code. As such, to perform an editing work of a machining program, an advanced knowledge of the editing content according to each type of numerical control (NC) code is required. Even with such a knowledge, it is difficult to edit it rapidly and accurately.

The present invention has been made to solve such problems. An object of the present invention is to provide a machining program editing apparatus that enables a machining program to be edited accurately in a short time, and a machine tool provided with it.

SUMMARY OF THE INVENTION

A machining program editing apparatus, according to the present invention, is a machining program editing apparatus for editing a machining program of a machine tool, including a control means for controlling a display content of a display means for displaying the machining program. When a preset NC code, among NC codes included in the machining program, is selected on the display means, the control means allows an edit window for inputting an editing content, according to the type of the NC code, to be displayed near a display position of the NC code.

Further, as an aspect of the present invention, when the selected NC code is an NC code having selectable correction candidate data, the control means may allow a list of the correction candidate data to be displayed on the edit window.

Further, as an aspect of the present invention, when the selected NC code is an NC code designating a spindle speed of the machine tool or a feed rate of a cutting tool, the control means may allow a numerical value input pad tab, having numerical value buttons, and a machining condition calculation tab, having an input area of a parameter required for calculating the spindle speed or the feed rate of the cutting tool, to be displayed on the edit window.

Further, as an aspect of the present invention, when the selected NC code is an NC code designating a coordinate value, the control means may allow a numerical value input pad having numerical value buttons to be displayed on the edit window.

Further, a machine tool, according to the present invention, is one provided with the machining program editing apparatus having the respective aspects described above.

According to the present invention, a machining program can be edited accurately in a short time.

BRIEF DESCRIPTION OF THE DRAWINGS

FIG. 3 illustrates data stored in an edit window storage unit of the present embodiment;

FIG. 4 illustrates an example of a workpiece offset setting window of the present embodiment;

FIG. 5 illustrates an example of a tool selection window of the present embodiment;

FIG. 6 illustrates an example of a tool offset selection window of the present embodiment;

FIG. 7 illustrates an example of a guidance input window of the present embodiment;

FIG. 8A illustrates an example of a numerical value input pad tab, and FIG. 8B illustrates an example of a machining condition calculation tab displayed when an S code is selected, of the present embodiment;

FIG. 9 is a flowchart showing a flow of processing to edit a machining program using the machining program editing apparatus in the present embodiment;

FIG. 10 is a flowchart showing a flow of processing to display an edit window in the present embodiment;

DETAILED DESCRIPTION OF THE PREFERRED EMBODIMENTS

Hereinafter, an embodiment of a machining program editing apparatus and a machine tool having the same, according to the present invention, will be described with use of the drawings.

A machining program editing apparatus 1 of the present embodiment is used for editing a machining program in a machine tool 10, and is configured of a computer such as a numerical control apparatus. Based on the edited machining program, the machining program editing apparatus 1 controls the machine tool 10, and performs various types of machining on a workpiece (machining target). The respective configurations will be described below in detail.

The machine tool 10 is a machine such as a lathe, a drilling machine, a boring machine, a milling machine, a gear cutting machine, or a grinding machine for performing machining such as cutting, boring, grinding, polishing, rolling, forging, or folding on a workpiece made of metal, wood, stone, resin, or the like. In the present embodiment, the machine tool 10 is configured to be numerically controllable by a machining program.

Figure 1:
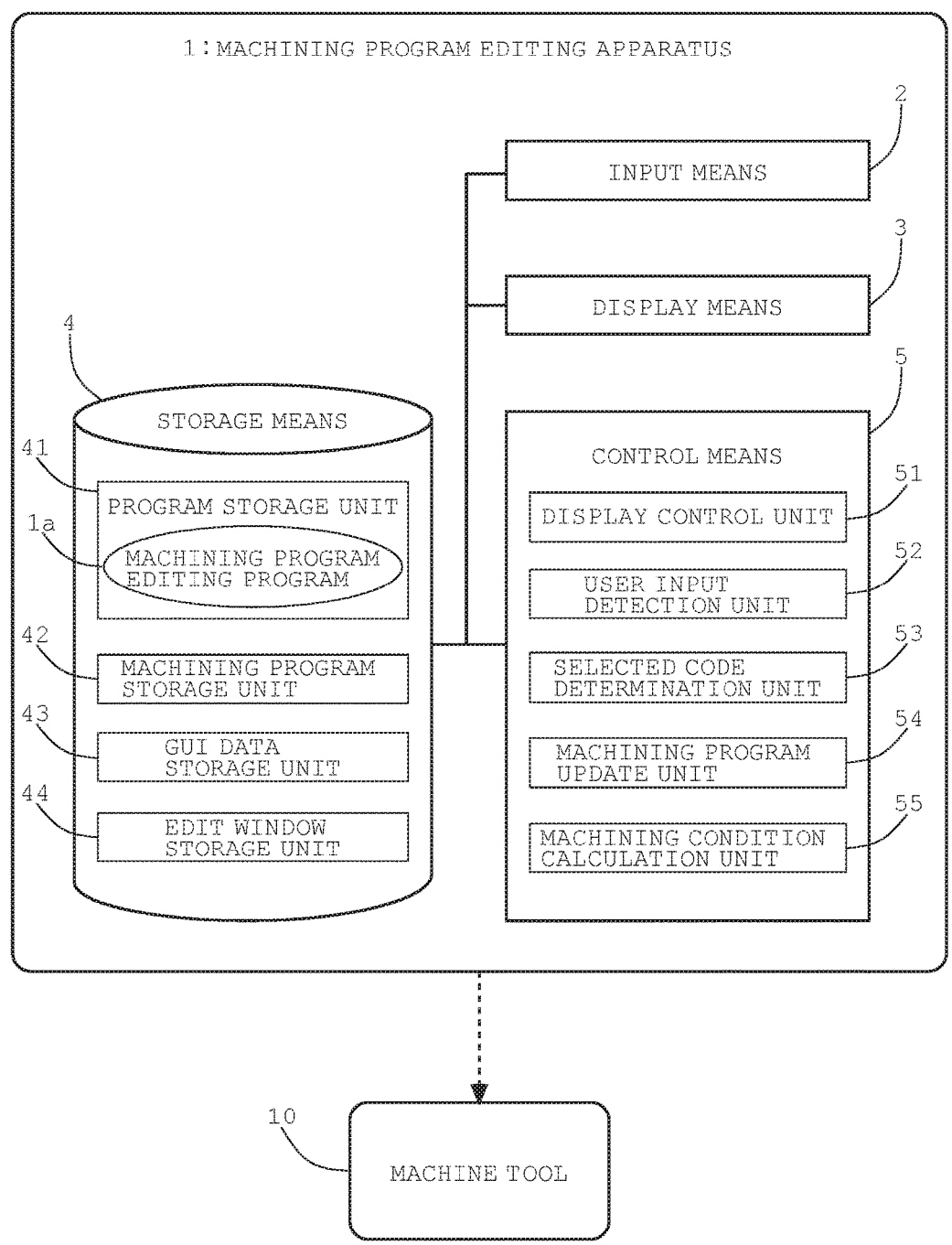
FIG. 1 is a block diagram illustrating an embodiment of a machining program editing apparatus according to the present invention.

The machining program editing apparatus 1 is configured of a computer such as a numerical control apparatus that controls the machine tool 10, and mainly includes an input means 2 for accepting an input from a user, a display means 3 for displaying a machining program and the like, a storage means 4 for storing a machining program editing program 1a and various types of data of the present embodiment, and a control means 5 for executing various types of arithmetic processing to function as the respective constituent units described below, as shown in FIG. 1. The respective constituent means will be described below in detail.

Figure 2:
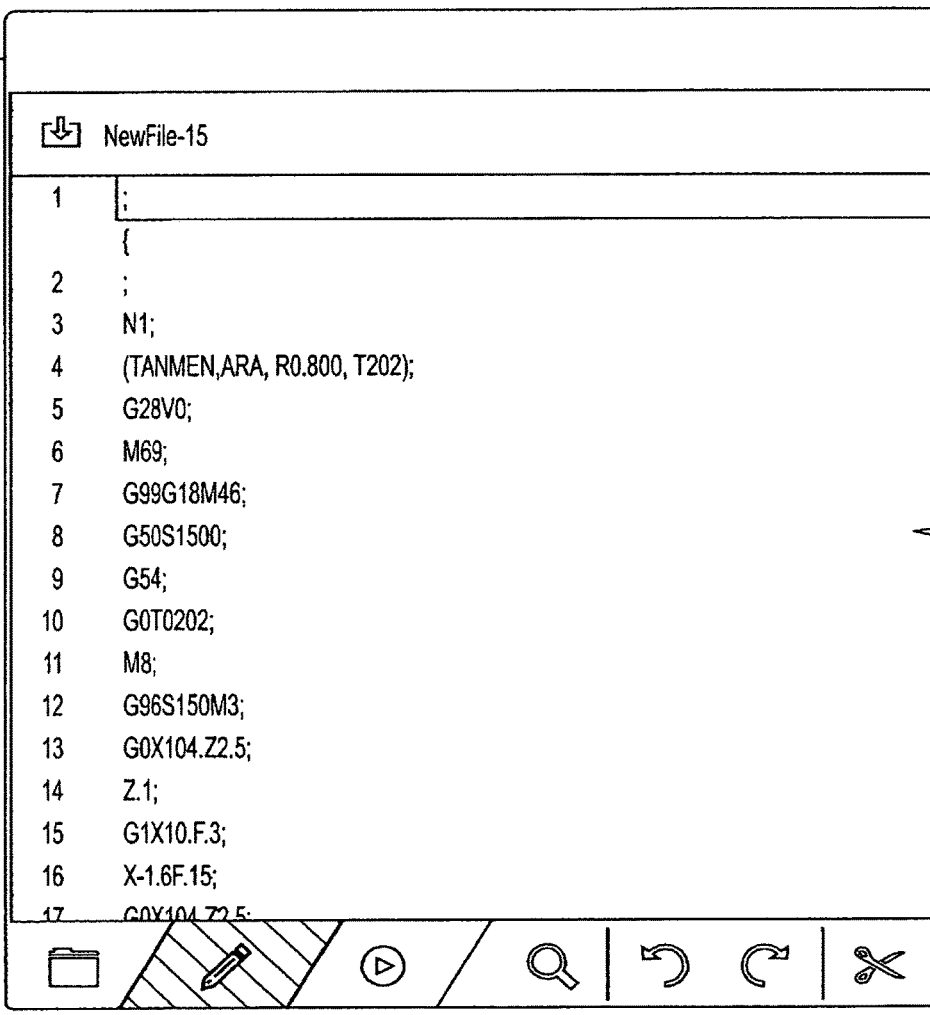
FIG. 2 illustrates an example of a machining program edit screen of the present embodiment.

The input means 2 is used for accepting an input of data or information from a user. In the present embodiment, the input means 2 outputs information of a position designated on the machining program edit screen 6 for editing a machining program as shown in FIG. 2, and data and the like input via an edit window 7 described below (FIGS. 4 to 8) to the control means 5.

The display means 3 is used for displaying the machining program edit screen 6, the edit window 7, and the like. In the present embodiment, the display means 3 displays a display content input from a display control unit 51 described below.

In the present embodiment, the input means 2 and the display means 3 are configured of a touch panel having both a position input function as the input means 2 by a touch pad or the like and a displaying function as the display means 3 by a liquid crystal panel or the like. Then, based on the touched position on the touch panel, various types of data and information are given to the control means 5. It should be noted that the system of a touch panel is not limited. It is possible to use any system such as a capacitive sensing system, a resistive membrane system, or a surface acoustic wave system, if data can be input based on a touched position.

Further, the input means 2 and the display means 3 are not limited to a touch panel. It is acceptable that the input means 2 configured of a pointing device such as a mouse and the display means 3 configured of a display device such as a liquid crystal monitor are provided separately. In that case, as a mouse pointer is displayed on the display means 3, various types of data and information are provided to the control means 5 based on the position of a mouse pointer when a left click is made, for example.

The storage means 4 stores various types of data, and also functions as a working area for performing arithmetic processing by the control means 5. In the present embodiment, the storage means 4 is configured of ROM (Read Only Memory), RAM (Random Access Memory), a flash memory, and the like, and includes a program storage unit 41, a machining program storage unit 42, a GUI data storage unit 43, and an edit window storage unit 44, as shown in FIG. 1. The respective constituent units will be described below in detail.

In the program storage unit 41, a machining program editing program 1a of the present embodiment is installed. The control means 5 executes the machining program editing program 1a to thereby cause a computer as the machining program editing apparatus 1 to function as the respective constituent units described below.

It should be noted that the use form of the machining program editing program 1a is not limited to the configuration described above. For example, the machining program editing program 1a may be stored in a computer-readable recording medium such as a USB memory, and directly read from the recording medium to be executed. Further, it may be used from an external server or the like using an ASP (Application Service Provider) system or a cloud computing system.

The machining program storage unit 42 is used for storing a machining program to be edited. In the present embodiment, a machining program in the machining program storage unit 42 is updated by a machining program update unit 54 described below, each time the machining program is edited.

In the present invention, a machining program is described using NC code for numerically controlling the machine tool 10. The NC code is configured of character strings including alphabetical and numerical values, which includes the following codes, for example:

G code: a code designating a preparatory function for performing machining (e.g., G54 or the like), M code: a code playing an auxiliary role of G code (e.g., M08 or the like), T code: a code designating a cutting tool, a correction amount and the like (e.g., T0202 or the like), S code: a code designating a spindle speed and the like of a machine tool, F code: a code designating a feed rate and the like of a cutting tool, and X, Y, Z, U, V, W, A, B, C: codes designating coordinates.

The GUI data storage unit 43 stores GUI data for displaying a graphical user interface that enables intuitive operation by the input means 2 on the display means 3. Specifically, data for displaying the machining program edit screen 6 and the like, as shown in FIG. 2, is stored.

The edit window storage unit 44 stores data for displaying the edit window 7 for inputting an editing content according to the type of an NC code. In the present embodiment, an NC code to be displayed on the edit window 7, among the NC codes described above, is preset, and data for displaying the edit window 7 is stored in association with each NC code. Further, in the present embodiment, the edit window 7 functions as a graphical user interface for inputting an editing content directly in the case of a touch input and inputting an editing content indirectly in the case of a mouse input, which is displayed independently on the machining program edit screen 6.

In the present embodiment, as shown in FIG. 3, G54 to G59 for setting workpiece coordinate systems, T code for designating a cutting tool offset amount, and the like, D code and H code for designating a correction amount of the cutting tool and the like, G code having parameters other than G54 to G59 (G487, etc.), S code designating a spindle speed of the machine tool, F code designating a feed rate of a cutting tool, and coordinate value codes (X, Y, Z, U, V, W, A, B, and C) designating coordinate values on respective control axis, are registered as preset NC codes in the edit window storage unit 44. Then, the edit window 7 for inputting an editing content according to each code is stored. The edit window 7 corresponding to each code will be described below.

With respect to G54 to G59, as shown in FIG. 3, a workpiece offset setting window 71, on which a list of selectable workpiece coordinate systems is displayed as correction candidate data, is stored as the edit window 7. As shown in FIG. 4, in the workpiece offset setting window 71, a list of coordinate values of respective control axis is displayed for respective selectable workpiece coordinate systems. Further, wording "selection of workpiece offset" showing the editing content appears in the title bar of the workpiece offset setting window 71.

With respect to T code, as shown in FIG. 3, a tool selection window 72, on which a list of selectable tools is displayed as correction candidate data, is stored as the edit window 7. As shown in FIG. 5, in the tool selection window 72, direction of the tool, undercut, usage, T code, nose R, pocket angle, included angle, and comments are stored in association with management numbers of the selectable tools. Further, wording "selection of tool" showing the editing content appears in the title bar of the tool selection window 72.

With respect to D code and H code, as shown in FIG. 3, a tool offset selection window 73, in which a list of selectable tool offsets is displayed as correction candidate data, is stored as the edit window 7. In the tool offset selection window 73, as shown in FIG. 6, shape correction amounts and abrasion correction amounts for the respective control axis are stored in association with offset numbers assigned to respective usages of the tools.

Further, wording "Selection of tool offset List of shape and abrasion corrections", showing the editing content, appear in the title bar of the tool offset selection window 73. In the present embodiment, with respect to the correction number indicated by the D code (D number), a correction amount of a tool diameter relative to the control axis of the tool is registered. Meanwhile, with respect to the correction number indicated by the H code (H number), a correction amount of a tool length relative to the control axis of the tool is registered.

It should be noted that in the present embodiment, G54 to G59, T code, D code, and H code correspond to NC codes having selectable correction candidate data, as described above. However, codes are not limited to these NC codes. It is possible to prepare correction candidate data with respect to NC codes to which selectable correction candidates can be provided.

With respect to G codes having parameters other than G54 to G59, as shown in FIG. 3, a guidance input window 74 is stored as the edit window 7. As shown in FIG. 7, in the guidance input window 74, description of the G code to be edited 74a, guidance 74b describing the editing content, and parameter input areas 74c according to the function are shown. In the present embodiment, G codes having parameters are NC codes for instructing various types of fixing cycles and the like to the machine tool 10, including all G codes requiring parameters (machining position, moving distance of the tool, and the like) such as G487, for example.

With respect to S code and F code, as shown in FIG. 3, the edit window 7 including the numerical value input pad tab 75 and the machining condition calculation tab 76, displayed alternatively, is stored. As shown in FIG. 8A, the numerical value input pad tab 75 is configured of a numerical value input pad having buttons same as those of a typical calculator, besides numerical value buttons for inputting numerical values of various parameters.

On the other hand, the machining condition calculation tab 76 has an input area 76a for parameters required for calculating a spindle speed (S code) of the machine tool or a feed rate (F code) of a cutting tool, and a calculation result display area 76b for displaying a calculated result. It should be noted that a spindle speed S, designated by the S code, is calculated according to the following Expression (1):

$$S=1000\ V(\text{cutting speed})/\pi \cdot D(\text{tool diameter}) \qquad \text{Expression (1)}$$

As such, in the machining condition calculation tab 76 with respect to the S code, the input areas 76a for the cutting speed V and the tool diameter D are displayed, and the calculation result display area 76b showing the calculated spindle speed S is displayed, as shown in FIG. 8B.

Further, the feed rate F, designated by F code, is calculated according to the following Expression (2):

$$F=f(\text{feed amount per tooth})\times Z(\text{the number of teeth})\times N(\text{spindle revolution speed}) \qquad \text{Expression (2)}$$

As such, in the machining condition calculation tab 76 with respect to F code, the input areas 76a for the feed amount per tooth f, the number of teeth Z, and the spindle revolution speed N are displayed, and the calculation result display area 76b, showing the calculated feed rate F, is displayed.

With respect to coordinate value codes, as shown in FIG. 3, a numerical value input pad for inputting coordinate values is stored as the edit window 7. As the numerical value input pad, a numerical value input pad tab 75 shown in FIG. 8A is displayed independently as a sole window, in which coordinate values are input using numerical value buttons.

Next, the control means 5 is a means that controls the input means 2, the display means 3, and the storage means 4 as described above, and executes various types of arithmetic processing, whereby when a preset NC code, among the NC codes included in the machining program, is selected on the display means 3, allows the edit window 7, for inputting an editing content according to the type of the NC code, to be displayed near the display position of the NC code.

It should be noted that in the present invention, a position near the display position of an NC code is a concept including not only a display position of the NC code but also a position near the display position within a range where a user can see while hardly moving the eyes from the display position.

In the present embodiment, the control means 5 is configured of a CPU (Central Processing Unit) or the like, which executes a machining program editing program 1a installed in the storage means 4 to function as a display control unit 51, a user input detection unit 52, a selected code determination unit 53, a machining program update unit 54, and a machining condition calculation unit 55, as shown in FIG. 1. The respective constituent units will be described below in more detail.

The display control unit 51 is used for controlling the display content of the display means 3. In the present embodiment, when a user selects a machining program that the user wishes to edit, the display control unit 51 reads the machining program from the machining program storage unit 42 and reads GUI data from the GUI data storage unit 43, and causes the display means 3 to display the machining program edit screen 6 as shown in FIG. 2.

Further, when a preset NC code, among the NC codes included in the machining program, is selected on the display means 3 via the input means 2, the display control unit 51 acquires the edit window 7 corresponding to the NC code from the edit window storage unit 44. Then, the display control unit 51 allows the edit window 7 to be displayed near the display position of the selected NC code.

Specifically, when the selected NC code is an NC code having selectable correction candidate data such as any of G54 to G59, T code, D code, and H code as described above, the display control unit 51 allows a list of correction candidate data to be displayed on the edit window 7.

Further, when the selected NC code is an NC code designating a spindle speed of the machine tool or a feed rate of a cutting tool such as S code or F code as described above, the display control unit 51 allows the numerical value input pad tab 75, having numerical value buttons, and the machining condition calculation tab 76, having input areas 76a for parameters required for calculating a spindle speed or a feed rate of the cutting tool, to be displayed on the edit window 7. Then, upon acquisition of machining conditions such as a spindle speed of the machine tool or a feed rate of the cutting tool calculated by the machining condition calculation unit 55, the display control unit 51 allows such machining conditions to be displayed on the calculation result display area 76b of the machining condition calculation tab 76.

Further, when the selected NC code is an NC code designating coordinate values like the coordinate value code as described above, the display control unit 51 allows a numerical value input pad, having numerical value buttons, to be displayed on the edit window 7.

The user input detection unit 52 detects a touched position on the display means 3, input from a user via the input means 2. In the present embodiment, the user input detection unit 52 regularly monitors a touched position on the machining program edit screen 6. Then, when an NC code included in the machining program is touched (selected), the selected NC code (selected code) is provided to the selected code determination unit 53.

Further, in a state where the edit window 7 is displayed, the user input detection unit 52 monitors a touched position on the edit window 7. Then, the user input detection unit 52 specifies the editing content based on the touched position, and provides the machining program update unit 54 or the machining condition calculation unit 55 with it.

The selected code determination unit 53 determines whether or not an NC code selected by the user is a preset NC code. In the present embodiment, the selected code determination unit 53 determines whether or not a selected NC code is an NC code previously set in the edit window storage unit 44. Then, if it is a preset NC code, the selected code determination unit 53 provides the display control unit 51 with the NC code.

The machining program update unit 54 updates the machining program based on the editing content input from the user. In the present embodiment, when the machining program update unit 54 receives an editing content provided from the user input detection unit 52, the machining program update unit 54 updates the machining program stored in the machining program storage unit 42 based on the editing content.

The machining condition calculation unit 55 calculates machining conditions such as a spindle speed of the machine tool or a feed rate of the cutting tool. In the present embodiment, when the machining condition calculation unit 55 acquires a parameter input in the input area 76a of the machining condition calculation tab 76, the machining condition calculation unit 55 calculates a spindle speed of the machine tool or a feed rate of the cutting tool, based on Expression (1) or Expression (2) described above. Then, the machining condition calculation unit 55 provides the display control unit 51 with the calculation result to thereby allow it to be displayed in the calculation result display area 76b.

Next, actions of the machining program editing apparatus 1 and the machine tool 10 provided with it, of the present embodiment, will be described.

Hereinafter, processing of editing a machining program using the machining program editing apparatus 1 of the present embodiment will be described, along with the processing of operating a graphical user interface displayed on the machining program editing apparatus 1. The processing described herein is processing for editing and inputting a source code of the machining program displayed on the display means 3 of the machining program editing apparatus 1 in accordance with an instruction from a user.

As shown in FIG. 9, in the case of editing a machining program with use of the machining program editing apparatus 1 of the present embodiment, first, the display control unit 51 allows the machining program edit screen 6 to be displayed on the display means 3 (step S1). Thereby, on the display means 3, a machining program including a plurality of NC codes is displayed on the machining program edit screen 6 as shown in FIG. 2.

Next, when a user touches a predetermined position on the machining program edit screen 6, the user input detection unit 52 determines whether or not an NC code is selected, based on the touched position (step S2). As a result of determination, when the selected position is not an NC code (step S2: NO), the processing proceeds to step S7 described below.

On the other hand, when an NC code is selected (step S2: YES), the selected code determination unit 53 determines whether or not the selected NC code is a preset NC code (step S3). As a result of determination, when it is not a preset NC code (step S3: NO), the processing proceeds to step S7 described below.

Meanwhile, when the selected NC code is a preset NC code (step S3: YES), the display control unit 51 allows the edit window 7, corresponding to the type of the NC code, to be displayed near the display position of the NC code (step S4). As the edit window 7 is a user interface to which an editing content can be input, the user shifts to an editing work immediately while hardly moving the eyes from the touched position. Further, as the edit window 7 is configured such that an editing content only corresponding to the type of the NC code can be input, it is possible to prevent an erroneous editing content from being input. Details of the processing of displaying the edit window 7 corresponding to the NC code at step S4 will be described below.

When a user inputs an editing content by touching the edit window 7 (step S5: YES), the user input detection unit 52 acquires the editing content based on the touched position. Then, the machining program update unit 54 updates the machining program stored in the machining program storage unit 42 based on the editing content (step S6). Thereby, as the user is able to edit it without moving the eyes from the machining program edit screen 6, an editing time is shortened. If an editing content is not input (step S5: NO), the processing proceeds to step S7.

At step S7, it is determined whether or not to end the editing work of the machining program. Then, as long as the editing work continues (step S7: NO), the processing returns to step S2 to wait for selection of an NC code on the machining program edit screen 6. On the other hand, when termination of the editing work is instructed (step S7: YES), the machining program editing apparatus 1 ends the processing. It should be noted that termination of the editing work is determined by selection of an icon instructing termination of editing on the machining program edit screen 6, for example.

Next, specific processing of displaying the edit window 7 corresponding to an NC code selected by the user at step S4 will be described in detail with use of FIG. 10.

First, when it is determined that a preset NC code is selected at step S3, the display control unit 51 determines whether or not the NC code is an NC code having selectable correction candidate data (step S11). This means that in the present embodiment, it is determined whether or not the selected NC code is any of G54 to G59, T code, D code, and H code.

As a result of determination, if it is an NC code having selectable correction candidate data (step S11: YES), the display control unit 51 allows the edit window 7 to be displayed near the display position of the NC code, and allows a list of the selectable correction candidate data to be displayed (step S12).

Figure 11:
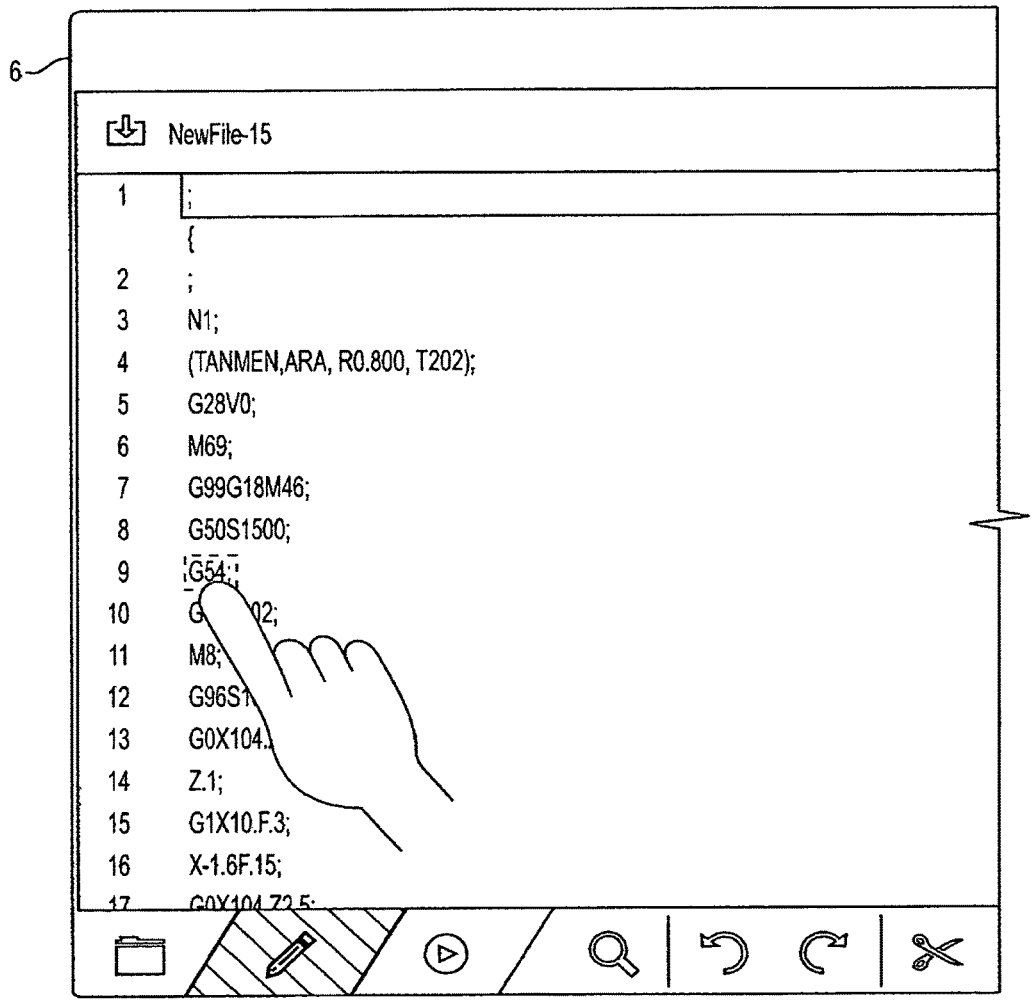
FIG. 11 illustrates a state of touching a preset NC code in the present embodiment.
Figure 12:
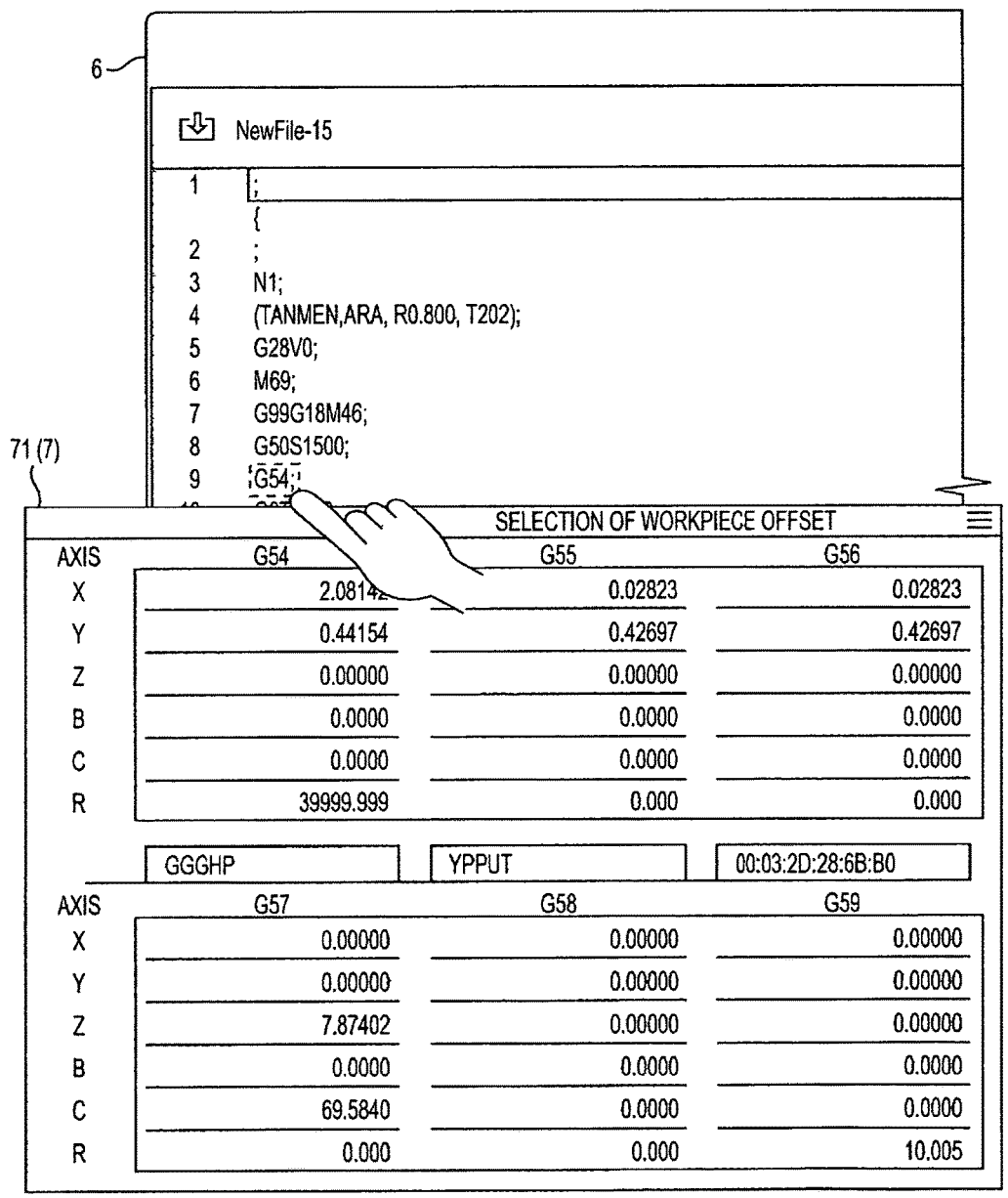
FIG. 12 illustrates a state of displaying an edit window near the display position of a selected NC code in the present embodiment.

For example, as shown in FIG. 11, when "G54" is touched and selected on the machining program edit screen 6, the display control unit 51 allows the workpiece offset setting window 71, in which other correction candidate workpiece coordinate systems "G55" to "G59" is listed in addition to the workpiece coordinate system currently set, to be displayed near the display position of "G54", as shown in FIG. 12.

Thereby, the user compares the current workpiece coordinate system and the other selectable workpiece coordinate systems while hardly moving the eyes from the touched position on the machining program edit screen 6, and specifies an appropriate workpiece offset immediately. Further, as only selectable candidates are displayed on the edit window 7, it is possible to suppress input of an erroneous editing content even by an inexperienced user.

It should be noted that when a T code is selected as an NC code having selectable correction candidate data, the tool selection window 72 as shown in FIG. 5 is displayed near the display position of the T code. As such, a user is able to check spec conditions of selectable tools while hardly moving the eyes from the touched position, and to appropriately select a desired tool accurately and immediately.

Further, when a D code or an H code is selected as an NC code having selectable correction candidate data, the tool offset selection window 73 as shown in FIG. 6 is displayed near the display position of the D code or the H code. As such, a user is able to select a desired tool offset accurately and immediately while hardly moving the eyes from the touch position.

On the other hand, when the selected NC code is not an NC code having selectable correction candidate data (step S11: NO), the display control unit 51 determines whether or not the NC code is a G code having parameters (step S13). As a result of determination, if it is a G code having parameters (step S13: YES), the display control unit 51 allows the guidance input window 74 as the edit window 7 to be displayed near the display position of the G code (step S14).

For example, when "G487" is touched and selected as a G code having parameters, the display control unit 51 allows the guidance input window 74 as shown in FIG. 7 to be displayed near the display position of the "G487". Thereby, the user is able to check the description 74a of "G487", and the user is only necessary to perform inputting in accordance with the guidance 74b. As such, editing errors are reduced.

Further, as parameter input areas 74c are shown in the guidance input window 74, when any of the input areas 74c is touched and selected, a numerical value input pad is displayed. As such, the user is able to input a parameter without moving the eyes from the machining program edit screen 6, whereby editing work is performed rapidly.

Next, as a result of determination at step S13, when the selected NC code is not a G code having parameters (step S13: NO), the display control unit 51 determines whether or not the NC code is an NC code (S code) designating a spindle speed of the machine tool or an NC code (F code) designating a feed rate of a cutting tool (step S15).

As a result of determination, if it is an S code or an F code (step S15: YES), the display control unit 51 allows the edit window 7 having the numerical value input pad tab 75 and the machining condition calculation tab 76, in which either one of them can be displayed alternatively, to be displayed near the display position of the S code or the F code (step S16).

For example, when an S code is touched and selected, the display control unit 51 allows the numerical value input pad tab 75 as shown in FIG. 8A and the machining condition calculation tab 76 as shown in FIG. 8B to be displayed near the display position of the S code. Then, when the user touches to select either of the tabs, the display is switched to the tab. Further, in the machining condition calculation tab 76, when the parameter input area 76a is selected, a numerical value input pad is displayed to enable a required numerical value to be input.

With the configuration described above, on the machining condition calculation tab 76, when the user inputs numerical values in the input areas 76a for the cutting speed and the tool diameter (step S17: YES), the machining condition calculation unit 55 calculates a spindle speed according to Expression (1) described above. Then, the display control unit 51 allows the calculated spindle speed to be displayed on the calculation result display area 76b (step S18).

Thereby, a spindle speed is automatically calculated from the parameter, and the result thereof is checked visually. Further, when there is no problem in the spindle speed, the spindle speed is input as a parameter by only touching and selecting the "OK" button shown in FIG. 8B at step S5 described above. Accordingly, even for the parameter editing work requiring complicated calculation, accuracy and rapidity thereof are improved.

On the other hand, when no parameter is input from the machining condition calculation tab 76 (step S17: NO), or after a calculation result is shown (step S18), the user input detection unit 52 monitors whether or not the numerical value input pad tab 75 is selected (step S19). Then, when the numerical value input pad tab 75 is selected by a touch (step S19: YES), the display control unit 51 allows a numerical value input pad to be displayed (step S20). Thereby, the user is also able to directly input a desired spindle speed or a feed rate via the numerical value input pad.

It should be noted that in the case of an F code, operation is made in the same manner and the same actions and effects can be achieved as in the case of S code described above, except that a parameter to be input and a calculated result are different.

Meanwhile, as a result of the determination process at step S15, if it is determined that the selected NC code is neither an S code nor an F code (step S15: NO), one remaining as a preset NC code is an NC code designating coordinate values as shown in FIG. 3. As such, the display control unit 51 allows a numerical input pad to be displayed near the display position of the coordinate value code (step S20).

For example, when "Z2.5" is selected on the machining program edit screen 6, the display control unit 51 allows a numerical value input pad to be displayed near the display position of "Z2.5". Thereby, the user is able to input coordinate values by a touch via the numerical value buttons while hardly moving the eyes from the touch position.

It should be noted that after the edit window 7 is displayed at any of step S12, step S14, step S18, and step S20 described above, the processing returns to step S5 to wait for an editing input.

According to the present embodiment as described above, the effects described below can be achieved.

1. It is possible to transfer to an editing work rapidly while hardly moving the eyes from the display position of an NC code to be edited, and to perform editing in a short period.

2. As the edit window 7 is configured such that only an editing content corresponding to the type of the NC code can be input, it is possible to prevent an erroneous editing content from being input, whereby editing can be performed accurately.

3. As only selectable correction candidates are displayed on the edit window 7, it is possible to suppress input of an erroneous editing content even by an inexperienced user.

4. Even for an editing work of a parameter requiring complicated calculation, accuracy and rapidity can be improved, and it is also possible to directly input a numerical value of the parameter.

5. As a numerical value input pad is displayed when a numerical value must be input, a numerical value can be input immediately.

It should be noted that the machining program editing apparatus 1 according to the present invention is not limited to the embodiment described above, and it can be changed appropriate. For example, while the machining program editing apparatus 1 works as one function of the numerical control apparatus in the present embodiment described above, the present invention is not limited to this configuration. The machining program editing apparatus 1 may be configured separately from the numerical control apparatus, and the numerical control apparatus may be configured to acquire a machining program from the machining program editing apparatus 1 and numerically controls the machine tool 10.

Further, in the present embodiment, it is possible to add a function of, when a spindle speed or a feed rate is calculated by the machining condition calculation tab 76, checking whether or not the calculation result is within a numerical value range capable of being set in the machine tool 10. With this function, if the calculated spindle speed or the feed rate is not within the numerical value range, by displaying a dialogue prompting re-entering or the like, it is possible to suppress inputting of inappropriate machining conditions.

What is claimed is:

1. A machining program editing apparatus for editing a machining program of a machine tool, comprising:
   a storage means for storing
      a machining program that includes a plurality of numerical control (NC) codes, these NC codes including first and second NC codes, and
      information for creating an edit window through which the machining program is edited by an operator,
   a display means for displaying the machining program and the edit window read from the storage means, and
   a control means for
      identifying an NC code selected by the operator on the display means, and
      controlling a display content of the edit window in accordance with the selected NC code, wherein
   the display content of the edit window is chosen from at least two types of windows that are a selection window and an input window, the selection window being associated with the first NC code and the input window being associated with the second NC code,
      in the selection window, correction candidate data for editing the machining program being displayed such that the operator is able to select one of the correction candidate data to edit the machining program,
      in the input window, a numerical value input pad tab composed with numerical value buttons being displayed through which the operator is able to input a numerical value to edit the machining program; wherein
   when the operator chooses the selected NC code, which is among the NC codes included in the machining program, on the display means, the control means
      recognizes a display position of the selected NC code on the display means, and
      displays the edit window on the display means based on the recognized display position, and the control means
      chooses and displays the selection window for the edit window when the control means identifies the selected NC code as the first NC code, and
      chooses and displays the input window for the edit window when the control means identifies the selected NC code as the second NC code.

2. The machining program editing apparatus according to claim 1, wherein
   when the selected NC code is an NC code having selectable correction candidate data, the control means identifies the selected NC code as the first NC code, and displays a list of the correction candidate data on the edit window.

3. The machining program editing apparatus according to claim 1, wherein
   when the selected NC code is an NC code designating a spindle speed of the machine tool or a feed rate of a cutting tool, the control means identifies the selected NC code as the second NC code.

4. The machining program editing apparatus according to claim 1, wherein
   when the selected NC code is an NC code designating a coordinate value, the control means identifies the selected NC code as the second NC code.

5. The machining program editing apparatus according to claim 1, wherein
   the machining program includes another NC code that is different from the first or second NC code, and
   the another NC code is associated with one of the selection window and the input window.

6. The machining program editing apparatus according to claim 3, wherein
   the control means further displays a machining condition calculation tab having an input area of a parameter required for calculating the spindle speed or the feed rate of the cutting tool.

7. The machining program editing apparatus according to claim 1, wherein
   when the operator selects the one of the correction candidate data through the selection window, which is defined as a selected correction datum, the control means
      receives the selected correction datum and updates the machining program in accordance with the selected correction datum, and when the operator inputs the numerical value using the numerical value input pad tab in the input window, the control means receives the numerical value, and updates the machining program in accordance with the numerical value.

8. A machine tool for machining a workpiece, comprising:
a machining program editing apparatus for editing a machining program that is executed by the machine tool, the machining program editing apparatus comprising:
a storage means for storing
  a machining program that includes a plurality of numerical control (NC) codes, these NC codes including first and second NC codes, and
  information for creating an edit window through which the machining program is edited by an operator,
a display means for displaying the machining program and the edit window read from the storage means, and
a control means for
  identifying an NC code selected by the operator on the display means, and
  controlling a display content of the edit window in accordance with the selected NC code, wherein
the display content of the edit window is chosen from at least two types of windows that are a selection window and an input window, the selection window being associated with the first NC code and the input window being associated with the second NC code,
  in the selection window, correction candidate data for editing the machining program being displayed such that the operator is able to select one of the correction candidate data to edit the machining program,
  in the input window, a numerical value input pad tab composed with numerical value buttons being displayed through which the operator is able to input a numerical value to edit the machining program; wherein
when the operator chooses the selected NC code, which is among the NC codes included in the machining program, on the display means, the control means
  recognizes a display position of the selected NC code on the display means, and
  displays the edit window on the display means based on the recognized display position, and the control means
  chooses and displays the selection window for the edit window when the control means identifies the selected NC code as the first NC code, and
  chooses and displays the input window for the edit window when the control means identifies the selected NC code as the second NC code.

* * * * *